Aug. 11, 1970

R. W. KEYES 3,524,064

IMAGE INTENSIFIER USING PHOTOCONDUCTIVE
AND ELECTRO-OPTIC MATERIALS
Filed April 21, 1967

INVENTOR,
ROBERT W. KEYES.

ATTORNEYS

United States Patent Office 3,524,064
Patented Aug. 11, 1970

3,524,064
IMAGE INTENSIFIER USING PHOTOCONDUCTIVE AND ELECTRO-OPTIC MATERIALS
Robert W. Keyes, White Plains, N.Y., assignor, by mesne assignments, to the United States of America as represented by the Secretary of the Army
Filed Apr. 21, 1967, Ser. No. 634,051
Int. Cl. H01l 17/00
U.S. Cl. 250—213     3 Claims

ABSTRACT OF THE DISCLOSURE

A laminated solid-state light intensifying system capable of reproducing and amplifying an optical image projected on the surface of a solid-state device. The intensifier comprises essentially a layer of electro-optic material exhibiting a variable optical index of refraction in response to an applied electric field, a layer of photo-sensitive material having good insulating properties in the dark, and two electrodes which embrace therebetween the two layers. The photo-sensitive material serves to alter the magnitude of the electric field applied to the electro-optic layer in response to and corresponding to the intensity of a ray of light projected onto the photo-sensitive layer.

BACKGROUND OF THE INVENTION

The present invention relates generally to light intensifiers and more particularly to solid-state light amplifiers capable of obtaining essentially continuous amplification of a changing optical image projected on the surface of a laminated solid-state device.

Those concerned with the development of light intensifiers as related to the amplification and projection of both visible and invisible images have long recognized the need for a light amplifier capable of obtaining a continuous amplification of a changing optical image with a good gain characteristic and a fast response for viewing motion.

Various forms of image intensifying devices are known both for intensifying light images and also images formed with radiation other than light, such as X-rays, ultraviolet or infrared light. For instance, M. E. Haine discloses in U.S. 3,069,551 a sandwich of a photo-conductive layer and a transparent insulating layer between transparent electrically conducting layers. A potential is applied across the conducting layers so as to produce an electric field between the outer surfaces. The insulating layer has a charge storing surface in contact with the photo-conducting layer and upon irradiation of the photo-conducting layer a progressive discharge of the stored charge occurs through the lowered resistance regions of the photo-conductor exposed to the impinging radiation thus forming an intensified image of the originally detected image.

Image intensifying devices are utilized in several areas of technology, the most prevalent of these being electrophotographic reproduction as disclosed by Carlson in U.S. 2,297,691 wherein a uniform electrostatic charge is applied to the surface of a photoconductive insulating body and is subsequently selectively dissipated by exposure to a pattern of light and shadow. This exposure and its consequent dissipation of electric charge results in an electrostatic latent image which can later be developed or made visible by treatment with an electroscopic material which adheres to the electrostatic charge pattern and which, optionally, may be transferred to a second surface to form an electrophotographic or xerographic print or picture. Such prior art devices have served their purpose but have not proved entirely satisfactory under all conditions of service as the opaque materials known as "toners" in the prior art electrophotographic process have characteristically had a poor response to a changing image.

SUMMARY OF THE INVENTION

It is the general purpose of this invention to provide a solid state light intensifying system capable of obtaining a continuous amplification of a changing optical image projected on one surface of a laminated solid state device which will embrace all the advantages of similarly employed image intensifiers but possesses none of the aforedescribed disadvantages. To attain this, the present invention contemplates a unique combination of two effects, the control of electrostatic fields by the illumination of a photoconductor, and the variation of the transparency of an electro-optic material by the application of an electric field. The electro-optic material is essentially instantaneously responsive to the applied electric field to thereby render the continuous amplification of a changing image possible.

BRIEF DESCRIPTION OF THE DRAWING

The exact nature of this invention will be readily apparent from consideration of the following specification relating to the annexed drawing in which.

DESCRIPTION OF THE PREFERRED EMBODIMENT

Figure 1:
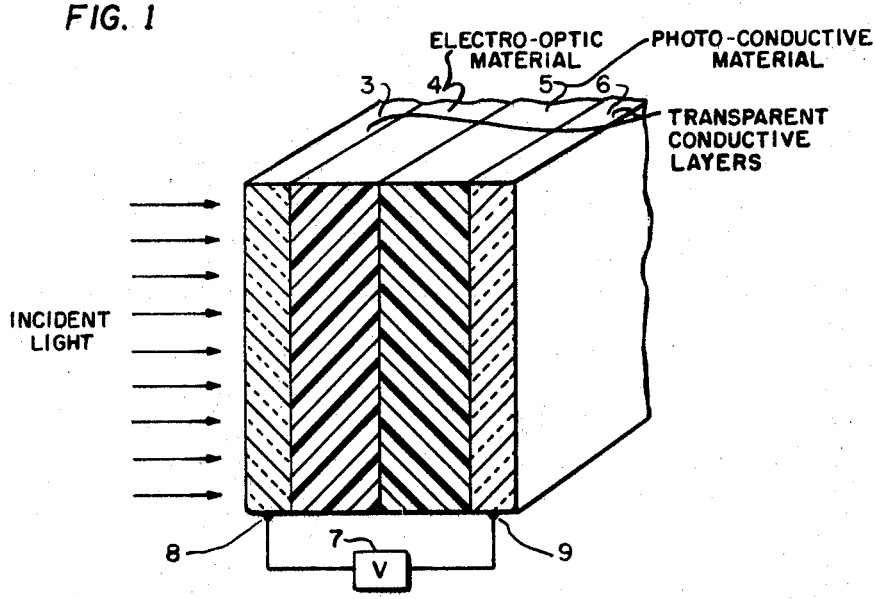
FIG. 1 is a perspective view, partially in section, of an image intensifying device constructed in accordance with the invention.

Referring now to the drawing, FIG. 1 shows an image intensifying device constituted of a layer of photoconductive material 5 and a layer of an electro-optical material 4 juxtaposed between two transparent conductive electrodes 3 and 6. A potential source 7 is connected across the planar device by ohmic connections at points 8 and 9 on transparent layers 3 and 6 respectively. The transparent layers or films of conductive material 3 and 6 may be any of a various number of materials known to meet the criteria required in this particular application, such as a layer of evaporated silver or tin chloride or a layer resulting from a reaction of stannous chloride with a base of glass. The photoconductor material of layer 5 is a dielectric lamina having a high dark electrical impedance, such as cadmium sulfide, zinc sulfide, amorphous or non-crystallized selenium. The thickness of the photoconductive lamina may be varied throughout a wide range to produce the operating characteristic desired. Layers from about 10 to 300 microns are useful with 50 microns representing a typical value. The electro-optic material of layer 4 may be crystals of high resistivity gallium-arsenide which exhibit a variable optical index of refraction in response to an electric field. The thickness of the layer would generally be about 50 microns but it may vary greatly. A device utilizing this principle is generally referred to as a Stark modulator.

The basic requirement of the photoconductive material is that its impedance per unit area in the dark be many times greater than the impedance of the electro-optic material per unit area. In addition the sensitivity of the photoconductor must be such that its impedance at the desired low input levels is comparable with the impedance of the electro-optic layer.

In operation, a charge is deposited at the interface between the electro-optic layer 4 and the photo-conductive layer 5 so that electric fields are established across the layers. The impedance of each of the electro-optic layer 4 and photo-conductive layer 5 in the dark is high enough to prevent current flow so as to maintain the charge on the interface. However, when light, or a light image, is projected onto the device, as shown by the arrows, the impedance of illuminated portions of the photo-conductive layer 5 is reduced, thereby producing a low resistance path between the interface and transparent conductive layer 6. The charge on the interface is discharged along this conductive path, and the electric field across electro-optic layer 4 is thereby removed. Accordingly, the transparency of the device is altered. The pattern of transparency now imposed on the device can be projected by an optical system, for example, the optical system for a movie camera, using light in a spectral region in which electro-optic layer 4 has a large electro-optic effect but in which photo-conductive layer 5 is insensitive. During this phase of operation, the device 7 provides a short circuit between transparent conductive layers 3 and 6.

Figure 2:
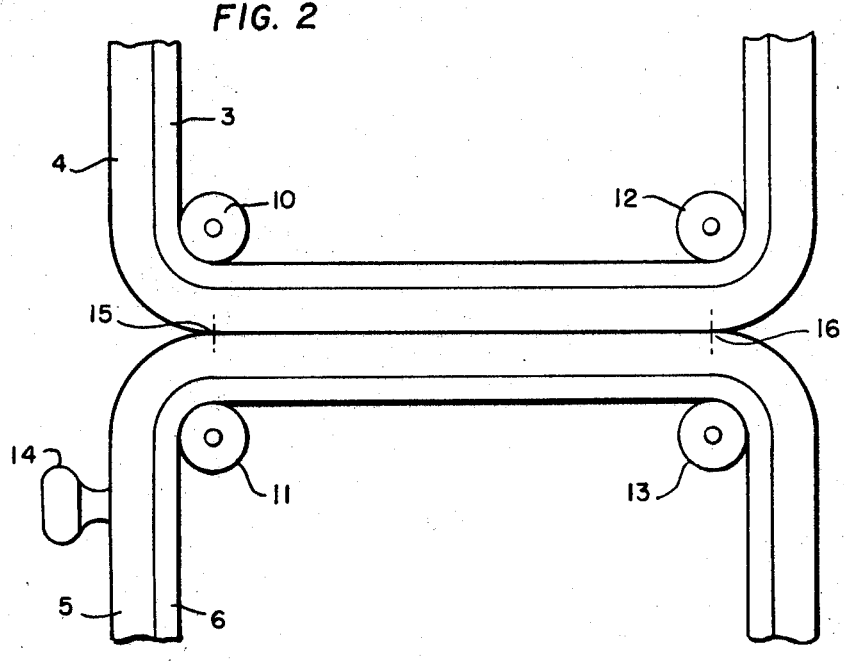
FIG. 2 portrays a method of placing a charge on the surface of the photo-conductor as required by the immediate invention.

FIG. 2 shows the preferred method of charging the surface of the photo-conductor and depicts the steps of forming the laminated structure by feeding a first two-layer film of a transparent conductive material 3 and an electro-optic material 4 and a second two-layer film of a precharged photo-conductive layer 5 and a transparent conductive material 6 through sets rollers 10, 11 and 12, 13. The surface of the photo-conductive layer 5 may be charged by any of several well known methods. A preferred method of sensitizing photo-conductive layer 5 is by utilizing a corona discharge unit 14 to place thereon, in the dark, a uniform positive charge as disclosed in U.S. 2,777,957 to L. E. Walkup. Provision is made for moving the films over guide rollers 10 and 11 for forming an integrated structure as shown in FIG. 1 in the region 15–16. Before passing through guides 10 and 11, the films are separate and the surface of the photo-conductive layer 5 is charged by the charging electrode 14. Depending on the application involved, the motion of the films might be continuous or a series of discontinuous displacements.

Another method of depositing the charge on the interface involves applying a sufficiently large voltage across transparent conductive layers 3 and 6 by means of device 7 to cause non-destructive electrical breakdown of the electro-optic layer 4, permitting charge to pass through it to the surface of the photo-conductive layer 5 desired to be charged. The charging step must be carried out in the dark, otherwise the photo-conductive layer 5 will not have an impedance sufficient to hold the charge.

It should be understood that the foregoing disclosure relates to only a preferred embodiment of the invention and that numerous modifications or alterations may be made therein without departing from the spirit and scope of the invention as set forth in the appended claims.

I claim:
1. In a solid-state image intensifying system, characterized by the capability of reproducing and intensifying a continuously changing optical image, a laminated solid-state control device comprising:
   a layer of electro-optic material exhibiting a variable optical index of refraction in response to an applied electric field;
   a layer of photo-sensitive material having good insulating properties in the dark; and
   two transparent conductive electrodes which embrace therebetween the contiguous layers of electro-optic material and photo-sensitive material; and
   means for depositing a charge on the surface of the photo-sensitive material immediately adjacent the electro-optic material;
   whereby high intensity radiation impinging on the charged surface of the photo-sensitive material, by way of the layer of electro-optic material, effects a decrease in impedance of the irradiated areas thereof to thereby provide a low impedance path for progressively discharging the stored charge placed on the photo-sensitive layer for varying the electric field across the electro-optic layer to change the optical index of refraction of the electro-optic material, thereby allowing the passage of the high intensity radiation through both layers of the control device for effecting an intensification of the deposited charge image placed on the photo-sensitive layer in accordance with the degree of intensity of the incident radiation.

2. A solid-state image intensifier as set forth in claim 1 wherein the means for depositing a charge on one surface of the photo-sensitive material is a voltage source connected to the transparent conductive layers of material to effect a non-destructive electrical breakdown of the electro-optic layer thus permitting the passage of a charge through the electro-optic layer and a charge deposition on the surface of the photo-sensitive layer.

3. A solid-state image intensifier as set forth in claim 1 further including means for projecting said image formed in the electro-optic material.

References Cited

UNITED STATES PATENTS

| 2,892,380 | 6/1959 | Baumann et al. | 350—160 |
| 3,069,551 | 12/1962 | Haine | 250—83.3 |
| 3,214,272 | 10/1965 | Ploke | 350—161 |
| 3,238,843 | 3/1966 | Heller | 350—160 |

WILLIAM F. LINDQUIST, Primary Examiner

M. ABRAMSON, Assistant Examiner

U.S. Cl. X.R.

350—160